United States Patent
Yamada (10) Patent No.: US 7,423,518 B2
(45) Date of Patent: Sep. 9, 2008

(54) READER/WRITER

(75) Inventor: Toshimichi Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 11/354,059

(22) Filed: Feb. 15, 2006

(65) Prior Publication Data

US 2006/0214799 A1 Sep. 28, 2006

(30) Foreign Application Priority Data

Mar. 25, 2005 (JP) ............................ 2005-087920

(51) Int. Cl.
*H04Q 5/22* (2006.01)
(52) U.S. Cl. .................. 340/10.51; 340/572.7
(58) Field of Classification Search ............... 340/10.1, 340/10.51, 572.1, 572.7

See application file for complete search history.

(56) References Cited

U.S. PATENT DOCUMENTS

| | | | | |
|---|---|---|---|---|
| 5,699,046 A | * | 12/1997 | Accolla et al. | 340/10.5 |
| 7,205,896 B2 | * | 4/2007 | Wu et al. | 340/10.51 |
| 7,232,068 B2 | * | 6/2007 | Uchiyama et al. | 235/451 |
| 2006/0132287 A1 | * | 6/2006 | Phipps et al. | 340/10.1 |

FOREIGN PATENT DOCUMENTS

JP 2000-036020 A 2/2000

* cited by examiner

*Primary Examiner*—Thomas J Mullen, Jr.
(74) *Attorney, Agent, or Firm*—Oliff & Berridge, PLC (57) ABSTRACT

An reader/writer performing a two-way communication with a contactless tag through electromagnetic induction and supplying electric power to the contactless tag, includes: an antenna circuit having an antenna coil for electromagnetically coupling with an antenna coil in the contactless tag, the antenna circuit provided in the plural number, a first amplifier circuit amplifying a signal which the antenna circuits send outside, a first switch provided between the first amplifier circuit and each antenna circuit, the first switch provided in the plural number, a second amplifier circuit amplifying a signal which the antenna circuit received, a second switch provided between the second amplifier circuit and each antenna circuit, the second switch provided in the plural number and a control circuit turning on a predetermined switch among the first switches and a predetermined switch among the second switches, wherein the antenna coil has a loop shape and a plurality of the antenna coils are provided adjacently each other in the same plane, and the loop of the antenna coil has a shape such that an adjoining region of the antenna coils becomes as small as possible.

10 Claims, 4 Drawing Sheets

READER/WRITER

BACKGROUND

1. Technical Field

The present invention relates to a reader/writer forming a radio frequency identification (RFID) system.

2. Related Art

An RFID system including a contactless 1C card or a contactless tag such as an RF tag and a reader/writer has been known. Data and power are sent and received (two-way communication) between the tag and the reader/writer through electromagnetic induction.

In such RFID system, the reader/writer can communicate with one or more than one contactless tag located near the reader/writer. However, it cannot efficiently communicate with the contactless tag located away from the reader/writer at the same time with the tag located near the reader/writer.

JP-A-2000-36020 is an example of related art. In order to overcome such disadvantage, the example provides a plurality of antenna circuits for a transmission circuit of the reader/writer and switches between the transmission circuit and each of the plurality of the antenna circuits.

When the reader/writer has the plurality of the antenna circuits, there could be a case where antenna coils included in the antenna circuits should be placed adjacently each other or so as to overlap with the adjacent antenna coil. However, in this case, there could be a problem that the antenna coils interfere with each other.

Here, "the antenna coils interfere with each other" means the phenomenon that transmission power provided to the selected antenna coil in the reader/writer is absorbed by the other unselected antenna coil and the transmission power ends up decreasing, when the antenna coils are placed adjacently each other or so as to overlap with the adjacent antenna coil.

Consequently, the transmission power provided to the selected antenna coil in the reader/writer is not sufficiently transmitted to the antenna coil in the contactless tag.

SUMMARY

An advantage of the invention is to provide a reader/writer that can efficiently transmit the transmission power that is supplied to the selected antenna coil to the contactless tag in case where the single reader/writer uses the plurality of the antenna coils.

According to a first aspect of the invention, an reader/writer performing a two-way communication with a contactless tag through electromagnetic induction and supplying electric power to the contactless tag includes a plurality of antenna circuits, each of the plurality of antenna circuits having an antenna coil for electromagnetically coupling with an antenna coil in the contactless tag, a first amplifier circuit amplifying a signal which the antenna circuits transmits, a plurality of first switches, each of the plurality of first switches provided between the first amplifier circuit and each of the plurality of antenna circuits, a second amplifier circuit amplifying a signal which the plurality of antenna circuits received, a plurality of second switches provided between the second amplifier circuit and each of the plurality of antenna circuits, and a control circuit turning on a predetermined switch among the plurality of first switches and a predetermined switch among the plurality of second switches. The antenna coil has a loop shape and a plurality of the antenna coils are provided adjacently each other in the same plane, and the loop of the antenna coil has a shape such that an adjoining region of the antenna coils becomes as small as possible.

According to a second aspect of the invention, an reader/writer performing a two-way communication with a contactless tag through electromagnetic induction and supplying electric power to the contactless tag includes a plurality of antenna circuits, each of the plurality of antenna circuits having an antenna coil for electromagnetically coupling with an antenna coil in the contactless tag, a plurality of first amplifier circuits amplifying a signal which the antenna circuit transmits, a plurality of first switches, each of the plurality of first switches provided between each first amplifier circuit and each of the plurality of antenna circuits, a second amplifier circuit amplifying a signal which the antenna circuit received, a plurality of second switches, each of the plurality of second switches provided between the second amplifier circuit and each of the plurality of antenna circuits, and a control circuit turning on a predetermined switch among the plurality of first switches and a predetermined switch among the plurality of second switches. The antenna coil has a loop shape and the plurality of the antenna coils are provided adjacently each other in the same plane, and the loop of the antenna coil has a shape such that an adjoining region of the antenna coils becomes as small as possible.

In this case, it is preferable that the shape of the antenna coil included in the antenna circuit is a circular form.

It is also preferable that the first switch and the second switch are made of relay circuits with small parasitic impedance.

According to a third aspect of the invention, an reader/writer performing a two-way communication with a contactless tag through electromagnetic induction and supplying electric power to the contactless tag includes a plurality of antenna coils for electromagnetically coupling with an antenna coil in the contactless tag, a first amplifier circuit amplifying a signal which the plurality of antenna coils transmits, a plurality of matching circuits coordinating the plurality of antenna coils and the first amplifier circuit and made of an ungrounded circuit, a plurality of first switches, each of the plurality of first switches provided between each matching circuit and each of the plurality of antenna coils, a second amplifier circuit amplifying a signal which the plurality of antenna coils received and a plurality of second switches, each of the plurality of second switches provided between the second amplifier circuit and each of the plurality of antenna coils.

In this case, a control circuit turning on a predetermined switch among the first switches and a predetermined switch among the second switches may be further provided in the reader/writer.

According to a fourth aspect of the invention, an reader/writer performing a two-way communication with a contactless tag through electromagnetic induction and supplying electric power to the contactless tag includes a plurality of antenna coils for electromagnetically coupling with an antenna coil in the contactless tag, a first amplifier circuit amplifying a signal which the antenna coil sends outside, a plurality of matching circuits coordinating the antenna coil and the first amplifier circuit and made of a grounded circuit, a plurality of first switches provided between the first amplifier circuit and each matching circuit, a plurality of second switches provided between each of the plurality of matching circuits and each of the plurality of antenna coils, a second amplifier circuit amplifying a signal which the antenna coil received and a plurality of third switches, each of the plurality of third switches provided between the second amplifier circuit and each of the plurality of antenna coils.

In this case, a control circuit turning on a predetermined switch among the first switches, a predetermined switch among the second switches and a predetermined switch among the third switches may be further provided in the reader/writer.

It is preferable that the antenna coils include a main antenna coil and a sub antenna coil, the main antenna coil is a conductor formed in a loop shape, the sub antenna coil is a conductor formed in a loop shape, and a loop area of the sub antenna coil is relatively smaller than a loop area of the main antenna coil.

It is also preferable that the antenna coils include three antennas that are conductor formed in a loop shape, a first antenna of the three antennas is placed so as to point in a horizontal direction, second and third antennas of the three antennas are placed on right and left sides of the first antenna and so as to point in a vertical direction, and the three antennas are placed so as to form an U-shape when viewing the three antennas as a whole.

According to the aspects of the invention, the reader/writer can efficiently transmit the transmission power that is supplied to the selected antenna coil to the contactless tag side in case where the single reader/writer uses the plurality of the antenna coils.

BRIEF DESCRIPTION OF THE DRAWINGS

The invention will be described with reference to the accompanying drawings, wherein like numbers reference like elements.

DETAILED DESCRIPTION OF EMBODIMENTS

First Embodiment

Figure 1:
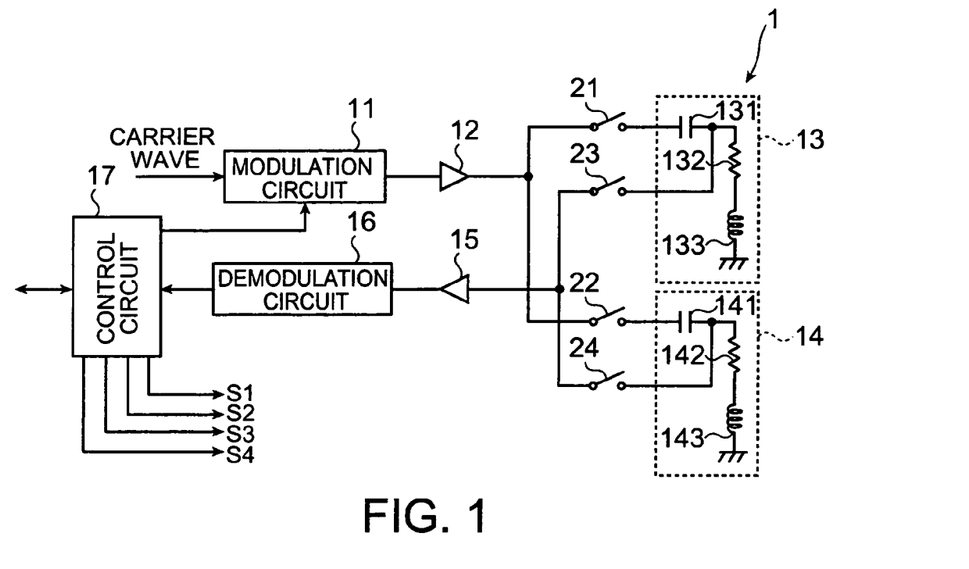
FIG. 1 is a circuit diagram showing a configuration of a reader/writer according to a first embodiment of the invention.

FIG. 1 is a circuit diagram showing a configuration of a reader/writer according to a first embodiment of the invention. A reader/writer 1 according to the first embodiment can perform a two-way communication with an unshown contactless tag through electromagnetic induction and can supply electric power to the contactless tag.

Accordingly, the reader/writer 1 has a modulation circuit 11, a power amplifier circuit 12, antenna circuits 13 and 14, an amplifier circuit 15, a demodulation circuit 16 and a control circuit 17 as shown in FIG. 1.

The reader/writer 1 further has switches 21, 22 between the power amplifier circuit 12 and the antenna circuits 13, 14, and switches 23, 24 between the amplifier circuit 15 and the antenna circuits 13, 14.

The modulation circuit 11 modulates a carrier wave from an oscillation circuit (not shown in the figure) according to send data outputted from the control circuit 17. The power amplifier circuit 12 amplifies the power of a modulation signal (modulation wave) from the modulation circuit 11 and sends the amplified modulation signal to the antenna circuit 13 or the antenna circuit 14.

The antenna circuit 13 emits the modulation signal amplified by the power amplifier circuit 12, for example, in a form of an electromagnetic wave, and receives a transmission electromagnetic wave (modulation wave) sent from the contactless tag (not shown in the figure). Accordingly, the antenna circuit 13 has a capacitor 131, an internal resistance 132 of the antenna and an antenna coil 133 that are coupled in series as shown in FIG. 1. One end of the capacitor 131 is coupled to one end of the switch 21. One end of the antenna coil 133 is grounded.

The antenna circuit 14 has the same function as that of the antenna circuit 13. Therefore, the antenna circuit 14 has a capacitor 141, an internal resistance 142 of the antenna and an antenna coil 143 that are coupled in series as shown in FIG. 1. One end of the capacitor 141 is coupled to one end of the switch 22. One end of the antenna coil 143 is grounded.

The amplifier circuit 15 amplifies the modulation signal which the antenna circuit 13 or the antenna circuit 14 received from the contactless tag. The demodulation circuit 16 demodulates receive data outputted from the amplifier circuit 15.

The control circuit 17 outputs the send data to the modulation circuit 11 based on an instruction of a host computer (not shown in the figure) and receives the receive data from the demodulation circuit 16 for the communication between the reader/writer and the contactless tag (not shown in the figure).

The control circuit 17 also generates, for example, on-off signals S1-S4 that control the switching of the switches 21-24 according to the instruction of the host computer. The on-off signals S1-S4 turn on/off the switches 21-24.

Various electronic switches such as metal-oxide semiconductor (MOS) transistors, relay circuits and analog switches are used for the switches 21-24.

In this embodiment, the switches 21-24 do not have to be frequently and rapidly switched over so that relay circuits for signals are appropriate for the switches 21-24. The relay circuit switches a junction on and off with direct-current excitation by an on-off signal (switching signal). Therefore, there is not a large parasitic impedance component at the junction. For this reason, effects of the switch circuit on a resonant circuit in the antenna coil part can be virtually ignored.

Next, a configuration example of the antenna coils 133 and 143 shown in FIG. 1 is described with reference to FIG. 3.

Figure 3:
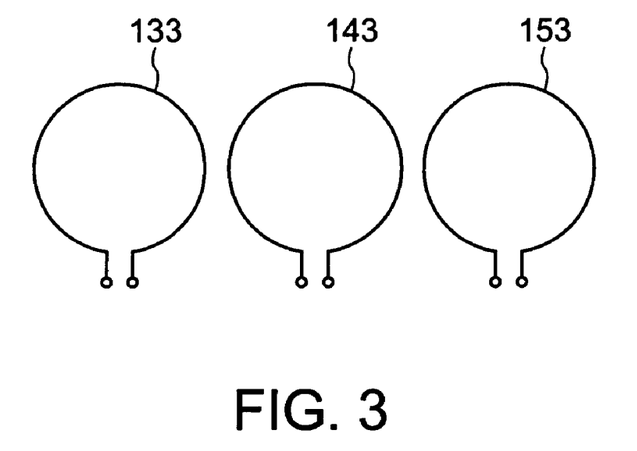
FIG. 3 is a plan view showing a shape and an arrangement example of antenna coils according to the first and second embodiments of the invention.

As shown in FIG. 3, the antenna coils 133, 143 are made in a circular shape and the number of turns may be either one or more than one. The circular shape of the antenna coils 133, 143 means that an adjoining region of the antenna coils 133, 143 is made as small as possible.

The shape of the antenna coils 133 and 143 may be an octagon, hexadecagon, triacontakaidigon and the like, though the circular shape as described above is most appropriate.

Next, an arrangement example of the antenna coils 133 and 143 in use is described with reference to FIG. 3 and FIG. 4.

FIG. 3 shows a case where the antenna coils 133, 143 and so on are arranged, for example, in a line in the same plane and relatively close to each other. In this example, an antenna coil 153 is added besides the antenna coils 133, 143.

Figure 4:
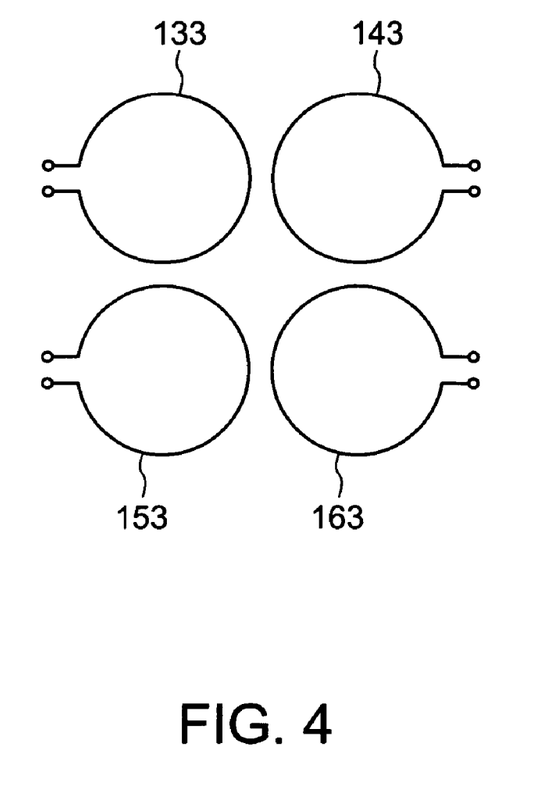
FIG. 4 is a plan view showing another shape and arrangement example of the antenna coil according to the first and second embodiments of the invention.

FIG. 4 shows a case where the antenna coils 133, 143 and so on are arranged, for example, in matrix in the same plane and relatively close to each other. In this example, the antenna coil 153 and an antenna coil 163 are added besides the antenna coils 133, 143.

Next, an operation example of the first embodiment having such structure is described.

In this first embodiment, the antenna circuits 13, 14 are selectively or individually used such that they are alternatively used.

Firstly, the control circuit 17 turns on (closes) the switch 21 and the switch 23 when the antenna circuit 13 is selected to be used. At this point, the modulation circuit 11 modulates the carrier wave according to the send data outputted from the control circuit 17 and outputs the modulated signal to the power amplifier circuit 12. The power amplifier circuit 12 amplifies the modulated signal in terms of power and outputs it to the antenna circuit 13. The antenna circuit 13 emits the modulated amplified signal in a form of, for example, an electromagnetic wave.

On the other hand, the antenna circuit 13 receives the transmission electromagnetic wave (modulation wave) sent from the contactless tag (not shown in the figure). The received signal is amplified by the amplifier circuit 15 and outputted to the demodulation circuit 16. The demodulation circuit 16 demodulates the receive data outputted from the amplifier circuit 15 and outputs it to the control circuit 17.

Next, when the antenna circuit 14 is selected, the control circuit 17 turns on the switch 22 and the switch 24. Other circuit operations are the same as those in the case of the antenna circuit 13.

In this first embodiment, the antenna coils 133, 134 are arranged in the same plane and relatively close to each other, and those shapes are a circle as shown in FIG. 3 and FIG. 4. The circular shape of the antenna coils 133, 143 means that the adjoining region of the antenna coils 133, 143 is made as small as possible.

Thereby, it is possible to prevent that the power is induced on the non-selected antenna coil 133 by the transmission power supplied to the selected antenna coil 143 through the electromagnetic induction. This advantageous effect is also obtained in the other case where the antenna coil 143 is not selected but the antenna coil 133 is selected.

As described above, according to the first embodiment, it is possible to efficiently transmit the transmission power that is supplied to the selected antenna coil to the antenna coil in the contactless tag in case where the antenna coils 133, 134 arranged as shown in FIG. 3 and FIG. 4 are used.

Second Embodiment

Figure 2:
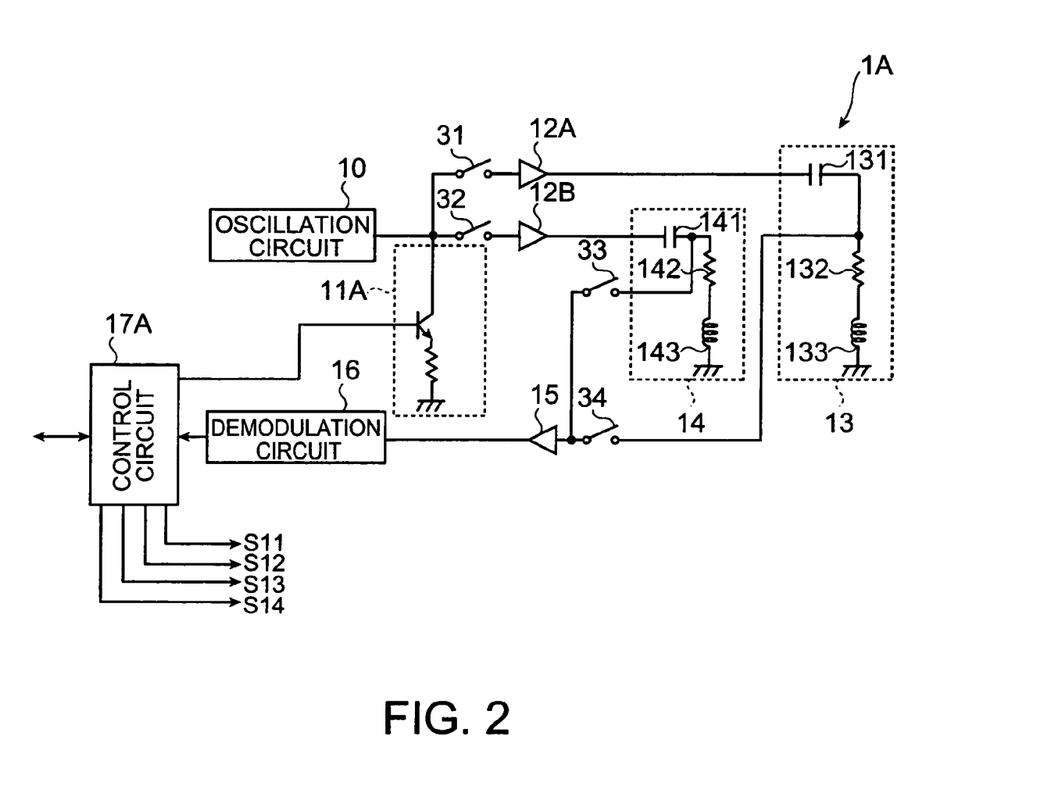
FIG. 2 is a circuit diagram showing a configuration of a reader/writer according to a second embodiment of the invention.

FIG. 2 is a circuit diagram showing a configuration of the reader/writer according to a second embodiment of the invention.

A reader/writer 1A according to the second embodiment can perform the two-way communication with an unshown contactless tag through the electromagnetic induction and can supply the electric power to the contactless tag.

Accordingly, the reader/writer 1A has an oscillation circuit 10, a modulation circuit 11A, power amplifier circuits 12A and 12B, the antenna circuits 13 and 14, the amplifier circuit 15, the demodulation circuit 16 and the control circuit 17A as shown in FIG. 2.

The reader/writer 1A further has switches 31, 32 correspondingly in the input sides of the power amplifier circuits 12A and 12B, and switches 33, 34 between the amplifier circuit 15 and the antenna circuits 13, 14.

The oscillation circuit 10 generates a carrier wave with a predetermined frequency. The modulation circuit 11A modulates the carrier wave from the oscillation circuit 10 according to send data outputted from the control circuit 17A. The modulation circuit 11A consists of transistors and resistors.

The power amplifier circuit 12A amplifies the power of the modulation wave from the modulation circuit 11A and outputs it to the antenna circuit 13. The power amplifier circuit 12B amplifies the power of the modulation wave from the modulation circuit 11A and outputs it to the antenna circuit 14.

The antenna circuit 13 emits the modulation signal amplified by the power amplifier circuit 12A in a form of, for example, an electromagnetic wave, and receives the transmission electromagnetic wave (modulation wave) sent from a contactless tag (not shown in the figure). Accordingly, the antenna circuit 13 has the capacitor 131, the internal resistance 132 of the antenna and the antenna coil 133 that are coupled in series as shown in FIG. 2. One end of the capacitor 131 is coupled to an output side of the power amplifier circuit 12A. One end of the antenna coil 133 is grounded.

The antenna circuit 14 has the same function as that of the antenna circuit 13. Therefore, the antenna circuit 14 has the capacitor 141, the internal resistance 142 of the antenna and the antenna coil 143 that are coupled in series as shown in FIG. 2. One end of the capacitor 141 is coupled to an output side of the power amplifier circuit 12B. One end of the antenna coil 143 is grounded.

The amplifier circuit 15 amplifies the modulation signal which the antenna circuit 13 or the antenna circuit 14 received from the contactless tag. The demodulation circuit 16 demodulates the receive data outputted from the amplifier circuit 15.

The control circuit 17A outputs the send data to the modulation circuit 11A based on the instruction of a host computer (not shown in the figure) and receives the receive data from the demodulation circuit 16 for the communication between the reader/writer 1A and the contactless tag (not shown in the figure).

The control circuit 17A also generates on-off signals S11-S114 that control the switching of the switches 31-34, for example, according to the instruction of the host computer. The on-off signals S11-S14 turn on/off the switches 31-34.

In this embodiment, the switches 31 and 32 may consist of gate circuits because the switches 31, 32 are provided on the input sides of the power amplifier circuit 12A, 12B and do not require large power. As for the switches 33, 34, various electronic switches such as MOS transistors, relay circuits and analog switches may be used. However, the relay circuits are most appropriate for the switches 33, 34 since they have small parasitic impedance.

The shape and the arrangement example of the antenna coils 133, 143 in FIG. 2 are shown in FIG. 3 and FIG. 4 in the same way as the antenna coils 133, 143 in FIG. 1.

Next, an operation example of the second embodiment having such structure is described.

In this second embodiment, the antenna circuits 13, 14 are selectively or individually used such that they are alternatively used. In addition, the embodiment includes the case where the both antenna circuits 13, 14 are used at the same time.

When the antenna circuit 13 is selected and used, firstly, the control circuit 17A turns on the switch 31 and the switch 34. At this point, the modulation circuit 11A modulates the carrier wave from the oscillation circuit 10 according to the send data outputted from the control circuit 17A and outputs the modulated signal to the power amplifier circuit 12A. The power amplifier circuit 12A amplifies the modulated signal in terms of power and outputs it to the antenna circuit 13. The antenna circuit 13 emits the modulated amplified signal in a form of, for example, an electromagnetic wave.

On the other hand, the antenna circuit 13 receives the transmission electromagnetic wave (modulation wave) sent from the contactless tag (not shown in the figure). The received signal is amplified by the amplifier circuit 15 and outputted to the demodulation circuit 16. The demodulation circuit 16 demodulates the receive data outputted from the amplifier circuit 15 and outputs it to the control circuit 17A.

Next, when the antenna circuit 14 is selected, the control circuit 17A turns on the switch 32 and the switch 33. At this point, the power amplifier circuit 12A operates instead of the power amplifier circuit 12B. Other circuit operations are the same as those in the case of the antenna circuit 13.

When the antenna circuit 13 and the antenna circuit 14 are used at the same time, the antenna circuit 13 and the antenna circuit 14 are respectively equipped with the amplifier circuit 15 and the demodulation circuit 16 (not shown in the figure). The control circuit 17A is operated so as to turn on the plurality of the selected switches. In this way, it is possible to simultaneously perform the two-way communications between the antennas and a plurality of the reader/writers.

In this second embodiment, the antenna coils 133, 143 are arranged in the same plane and relatively close to each other, and those shapes are a circle as shown in FIG. 3 and FIG. 4. Thereby, the same advantageous effect as that of the first embodiment can be obtained.

Third Embodiment

Figure 5:
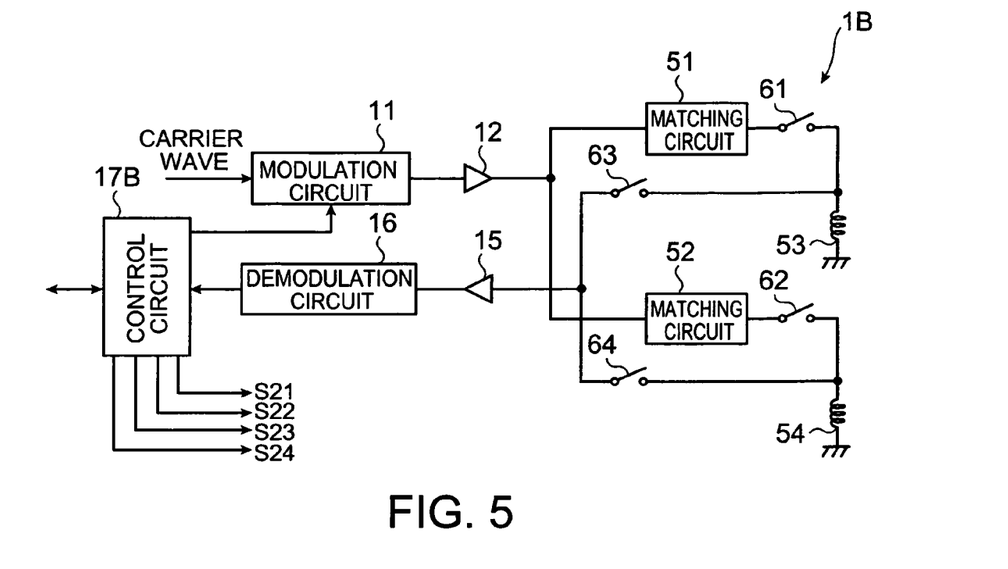
FIG. 5 is a circuit diagram showing a configuration of a reader/writer according to a third embodiment of the invention.

FIG. 5 is a circuit diagram showing a configuration of a reader/writer according to a third embodiment of the invention.

A reader/writer 1B according to the third embodiment can perform the two-way communication with an unshown contactless tag through the electromagnetic induction and can supply the electric power to the contactless tag.

Accordingly, the reader/writer 1B has the modulation circuit 11, the power amplifier circuit 12, matching circuits 51 and 52, antenna coils 53, 54, the amplifier circuit 15, the demodulation circuit 16 and the control circuit 17B as shown in FIG. 5.

The reader/writer 1B further has switches 61, 62 between the matching circuits 51 and 52 and the corresponding antenna coils 53, 54, and switches 63, 64 between the amplifier circuit 15 and the antenna coils 53, 54.

The modulation circuit 11 modulates the carrier wave from the oscillation circuit (not shown in the figure) according to a send data outputted from the control circuit 17B. The power amplifier circuit 12 amplifies the power of the modulation wave from the modulation circuit 11 and sends it to the matching circuit 51 and the antenna coil 53 or the matching circuit 52 and the antenna coil 54.

The matching circuit 51 coordinates the impedance of the power amplifier circuit 12 and that of the antenna coil 53. The matching circuit 51 includes an element component that forms a resonance circuit with the antenna coil 53. This matching circuit 51 is made of a kind of circuit that is used without connecting to ground. In other words, the matching circuit 51 does not include a grounded element in its circuit elements.

The matching circuit 52 coordinates the impedance of the power amplifier circuit 12 and that of the antenna coil 54. The matching circuit 52 includes an element component that forms a resonance circuit with the antenna coil 54. This matching circuit 52 is made of a kind of circuits that are used without connecting to ground. In other words, the matching circuit 52 does not include a grounded element in its circuit elements.

The antenna coil 53 emits the modulation signal amplified by the power amplifier circuit 12 in a form of, for example, an electromagnetic wave, and receives the transmission electromagnetic wave (modulation wave) sent from a contactless tag (not shown in the figure). Accordingly, one end of the antenna circuit 53 is grounded, and the other end is coupled to the output side of the matching circuit 51 through the switch 61 and the input side of the amplifier circuit 15 through the switch 63.

The antenna coil 54 has the same function as that of the antenna coil 53. Accordingly, one end of the antenna circuit 54 is grounded, and the other end is coupled to the output side of the matching circuit 52 through the switch 62 and the input side of the amplifier circuit 15 through the switch 64.

The amplifier circuit 15 amplifies the modulation signal which the antenna circuit 53 or the antenna circuit 54 received from the contactless tag. The demodulation circuit 16 demodulates the receive data outputted from the amplifier circuit 15.

The control circuit 17B outputs the send data to the modulation circuit 11 based on the instruction of the host computer (not shown in the figure) and receives the receive data from the demodulation circuit 16 for the communication between the reader/writer 1B and the contactless tag (not shown in the figure).

The control circuit 17B also generates on-off signals S21-S24 that control the switching of the switches 61-64, for example, according to the instruction of the host computer. The on-off signals S21-S24 turn on/off the switches 61-64.

Various electronic switches such as the MOS transistors, the relay circuits and the analog switches may be used for the switches 61-64.

Next, an operation example of the third embodiment having such structure is described.

In this third embodiment, the antenna coils 53, 54 are selectively or individually used such that they are alternatively used.

When the antenna coil 53 is selected and used, firstly, the control circuit 17B turns on the switch 61 and the switch 63. At this point, the modulation circuit 11 modulates the carrier wave according to the send data outputted from the control circuit 17B and outputs the modulated signal to the power amplifier circuit 12. The power amplifier circuit 12 amplifies the modulated signal in terms of power and outputs it to the antenna coil 53. The antenna coil 53 emits the modulated amplified signal in a form of, for example, an electromagnetic wave.

On the other hand, the antenna coil 53 receives the transmission electromagnetic wave (modulation wave) sent from the contactless tag (not shown in the figure). The received signal is amplified by the amplifier circuit 15 and outputted to the demodulation circuit 16. The demodulation circuit 16 demodulates the receive data outputted from the amplifier circuit 15 and outputs it to the control circuit 17B.

Next, when the antenna coil 54 is selected, the control circuit 17B turns on the switch 62 and the switch 64. Other circuit operations are the same as those in the case of the antenna coil 53.

According to the third embodiment, the switches 62, 64 are turned off and the antenna coil 54 is open when the antenna coil 53 is selected to be used by turning on the switches 61, 63. Thereby, an induced electromotive force is not generated on the antenna coil 54 by the operation of the antenna coil 53 even when the antenna coils 53, 54 are placed adjacently or so as to overlap each other. In addition, the antenna coil 54 will not attenuate the transmission power supplied to the antenna coil 53.

This advantageous effect can be obtained in the other case where the antenna coil 54 is selected to be used but the antenna coil 53 is not selected.

Consequently, according to the third embodiment, it is possible to individually drive the selected antenna coil regardless of the shapes, the sizes, the arrangements and the like of the antenna coils 53, 54. Furthermore, it is possible to effectively transmit the transmission power supplied to the selected antenna coil to the antenna coil in the contactless tag.

Fourth Embodiment

Figure 6:
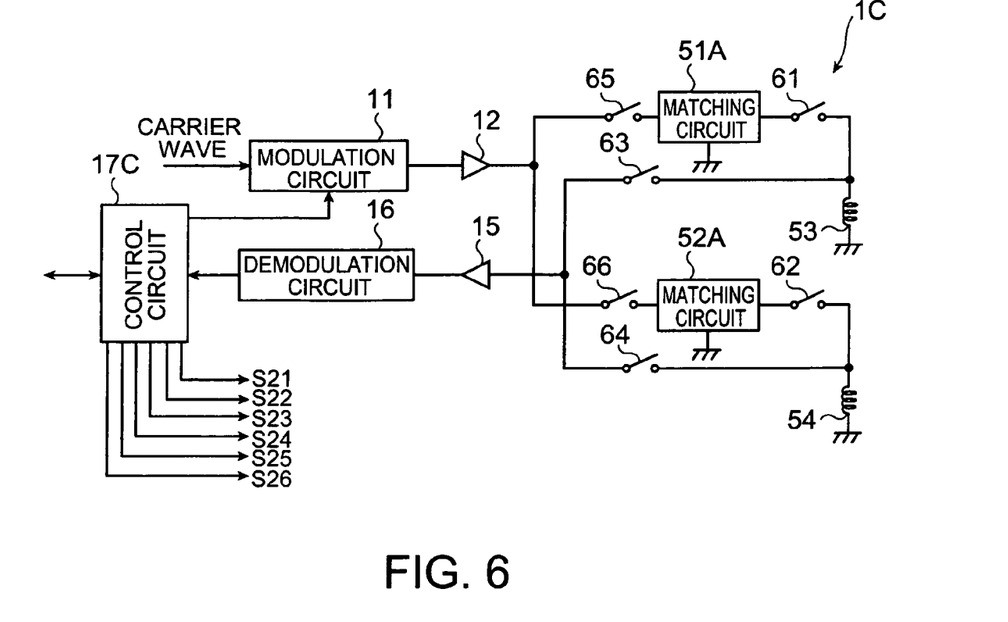
FIG. 6 is a circuit diagram showing a configuration of a reader/writer according to a fourth embodiment of the invention.

FIG. 6 is a circuit diagram showing a configuration of a reader/writer according to a fourth embodiment of the invention.

A reader/writer 1C according to the fourth embodiment can perform the two-way communication with an unshown contactless tag through the electromagnetic induction and can supply the electric power to the contactless tag.

The basic structure of the reader/writer 1C according to the fourth embodiment is the same as the structure of the reader/writer 1B shown in FIG. 5. However, the matching circuits 51, 52 are replaced by matching circuits 51A, 52A shown in FIG. 6 in the reader/writer 1C according to the fourth embodiment.

The matching circuit 51A coordinates the impedance of the power amplifier circuit 12 and that of the antenna coil 53. The matching circuit 51A includes an element component that forms a resonance circuit with the antenna coil 53. This matching circuit 51A is made of a kind of circuits that are used as grounded. In other words, the matching circuit 51A includes a grounded circuit in its circuit elements.

The matching circuit 52A coordinates the impedance of the power amplifier circuit 12 and that of the antenna coil 54. The matching circuit 52A includes an element component that forms a resonance circuit with the antenna coil 54. This matching circuit 52A is made of a kind of circuits that are used as connected to ground. In other words, the matching circuit 52A includes an element that is grounded in its circuit elements.

When the matching circuit 51A is grounded as described above, the matching circuit 51A could be a load on the power amplifier circuit 12 even though the antenna coil 53 is disconnected by turning off the switch 61. Such problem could also occur in the matching circuit 52A.

In order to avoid such problem from occurring, switches 65, 66 are correspondingly provided between the matching circuit 51A, 52A and the power amplifier circuit 12 in the fourth embodiment. The switches 65, 66 are turned on/off with on-off signals S25, S26 from the control circuit 17C.

Other structures of the fourth embodiment are the same as those of the third embodiment shown in FIG. 5. Therefore, the identical numerals are given to the same components and their descriptions are omitted.

In this fourth embodiment, the antenna coils 53, 54 are selectively or individually used such that they are alternatively used.

In other words, when the antenna coil 53 is selected to be used, the control circuit 17C turns on the switches 65, 61, 63. In this case, the matching circuit 52A will not be a load on the power amplifier circuit 12.

On the other hand, when the antenna coil 54 is selected to be used, the control circuit 17C turns on the switches 66, 62, 64. In this case, the matching circuit 51A will not be a load on the power amplifier circuit 12.

Consequently, the fourth embodiment can obtain the same advantageous effect as that of the third embodiment.

First Application Example of Embodiment

Next, a case where the reader/writers according to the third and fourth embodiments shown in FIG. 5 and FIG. 6 are applied to a system for searching a book (document) to which a contactless tag is attached among a plurality of books stored in a library is described.

Figure 7:
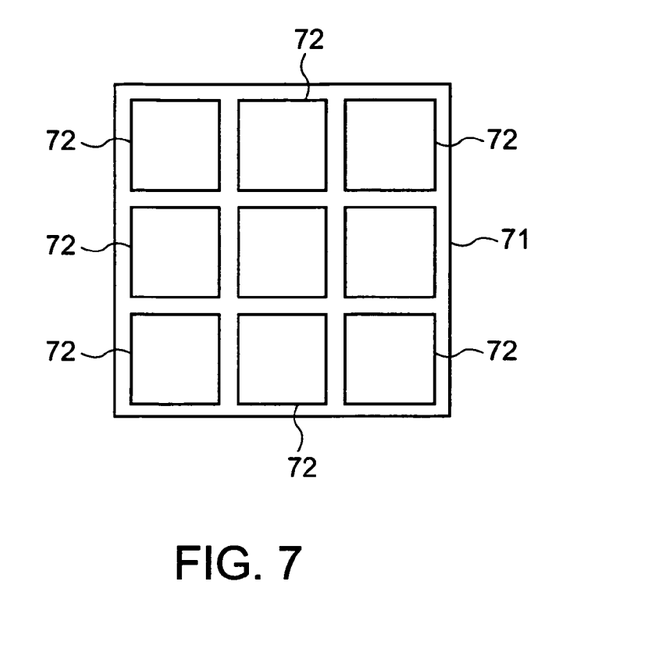
FIG. 7 shows a configuration example of antenna coils used in a first application example according to the third and fourth embodiments of the invention.

In this case, the coil shown in FIG. 7 is provided as the one corresponding to the antenna coils 53, 54 shown in FIG. 5. The coil consists of a bookshelf search antenna coil 71 and block search antenna coils 72. The bookshelf search antenna coil 71 is for searching a desired single bookshelf from a plurality of the bookshelves. The block search antenna coils 72 are for searching each block in the bookshelf. Each bookshelf is divided into blocks.

The bookshelf search antenna coil 71 covers all the bookshelves. The bookshelf search antenna coil 71 is formed in a predetermined loop shape according to the size of the bookshelf and placed, for example, on the back of the bookshelf. The block search antenna coils 72 are formed in a predetermined loop shape according to the contactless tags attached on the books and placed, for example, on the back of the bookshelf. The antenna coil 71 and the antenna coils 72 are provided such that their loop areas overlap each other.

In such book searching system, firstly, a desired bookshelf can be searched among the plurality of the bookshelves by driving the bookshelf search antenna coil 71. After the bookshelf is specified, the block (place) where the desired book is stored can be specified among the blocks in the bookshelf by selectively using the antenna coils 72.

In this case, the size of the antenna coil 71 is different from the size of the antenna coil 72 as shown in FIG. 7. Therefore, the roles of the antenna coils may be separated such that the bookshelf search antenna coil 71 is used for a high-power reader/writer and the block search antenna coils 72 are used for a low-power reader/writer.

In this example, the face of the bookshelf in which the books with the contactless tags are stored opposes to the face of the antenna coil. This example can be applied to other cases than the system for searching the book attached with the contactless tag.

For example, the example can be applied to a system for searching goods and commercial products attached with the contactless tags that might be provided in a disorderly manner.

Second Application Example of Embodiment

Next, a case where the reader/writers according to the third and fourth embodiments shown in FIG. 5 and FIG. 6 are applied to a system for sorting packages is described The directions in which the contactless tags are attached to packages transferred by a belt conveyer will not be constant.

In addition, the packages transferred by the belt conveyer will not point in one direction. For this reason, with the single antenna, the reader/writer could fail to read the information which is stored in the contactless tag attached to the package. Therefore, there is not enough credibility in the reader/writer with the single antenna.

Figure 8:
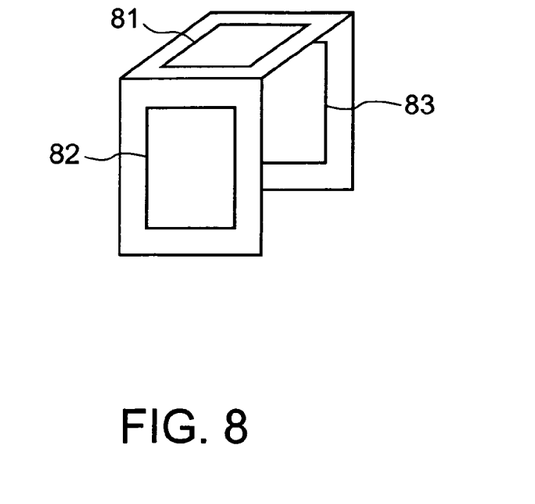
FIG. 8 shows the other configuration example of the antenna coils used in the first application example according to the third and fourth embodiments of the invention.

In order to overcome such problem, this example provides the antenna coil shown in FIG. 8 which corresponds to the antenna coils 53, 54 shown in FIG. 5. To be more specific, for example, a detector consisting of three antenna coils 81-83 which are conductor formed in a loop shape is provided on an insulating substrate.

In this detector, the antenna coil 81 is placed so as to face in the horizontal direction and other antenna coils 82, 83 are placed on the left and right sides of the antenna coil 81 and so as to point downward in the substantially vertical direction. In other words, the three antenna coils 81-83 are arranged in a reverse U-shape.

Such detector is placed just above the belt conveyer so that the package can pass through the detector when the package with the contactless tag is transferred on the belt conveyer. In this way, the reader/writer can use the three antenna coils 81-83 selectively to read the information in the contactless tag. Accordingly, the reader/writer can read out the information appropriately and the reliability can be improved.

This example can also applied to a system for reading product information of items for sale to which the contactless tags are attached while the items are in a shopping basket. In this case, the directions in which the contactless tags are attached to items will not be constant so that the information in the tag sometimes could not be read properly. However, if the plurality of the antenna coils is used selectively and in a combination as shown in FIG. 8, the product information can be assuredly read out from the contactless tag from more than one direction.

The entire disclosure of Japanese Patent Application No. 2005-087920, filed Mar. 25, 2005 is expressly incorporated by reference herein.

What is claimed is:

1. A reader/writer performing a two-way communication with a contactless tag through electromagnetic induction and supplying electric power to the contactless tag, comprising:
    a plurality of antenna circuits, each of the plurality of antenna circuits having a first antenna coil for electromagnetically coupling with a second antenna coil in the contactless tag;
    a first amplifier circuit amplifying a signal which each of the plurality of antenna circuits transmits;
    a plurality of first switches, each of the plurality of first switches provided between the first amplifier circuit and each antenna circuit;
    a second amplifier circuit amplifying a signal which each of the plurality of antenna circuits receives;
    a plurality of second switches, each of the plurality of second switches provided between the second amplifier circuit and each of the plurality of antenna circuits;
    a control circuit turning on a predetermined switch among the first switches and a predetermined switch among the second switches,
    wherein the first antenna coils have a loop shape and a plurality of the first antenna coils are provided adjacent to each other in the same plane, and the loop of the first antenna coils has a shape such that an adjoining region of the first antenna coils becomes as small as possible.

2. The reader/writer according to claim 1, wherein the shape of the first antenna coil included in each of the plurality of antenna circuits is circular.

3. The reader/writer according to claim 1, wherein each of the plurality of first switches and each of the plurality of second switches are made of relay circuits with small parasitic impedance.

4. A reader/writer performing a two-way communication with a contactless tag through electromagnetic induction and supplying electric power to the contactless tag, comprising:
    a plurality of first antenna coils for electromagnetically coupling with a second antenna coil in the contactless tag;
    a first amplifier circuit amplifying a signal which each of the plurality of first antenna coils transmits;
    a plurality of matching circuits coordinating an impedance of each of the plurality of first antenna coils and the first amplifier circuit and made of an ungrounded circuit;
    a plurality of first switches, wherein each of the plurality of first switches is provided between each of the plurality of matching circuits and each of the plurality of first antenna coils;
    a second amplifier circuit amplifying a signal which the plurality of first antenna coils receives; and
    a plurality of second switches, wherein each of the plurality of second switches is provided between the second amplifier circuit and each of the plurality of first antenna coils.

5. The reader/writer according to claim 4, further comprising:
    a control circuit turning on a predetermined switch among the plurality of first switches and a predetermined switch among the plurality of second switches.

6. The reader/writer according to claim 4, wherein the plurality of first antenna coils include a main antenna coil and a sub antenna coil, the main antenna coil is a conductor formed in a loop shape, the sub antenna coil is a conductor formed in a loop shape, and a loop area of the sub antenna coil is relatively smaller than a loop area of the main antenna coil.

7. The reader/writer according to claim 4, wherein the plurality of first antenna coils include three antennas that are conductor formed in a loop shape, a first antenna of the three antennas is placed so as to point in a horizontal direction, second and third antennas of the three antennas are placed on right and left sides of the first antenna so as to point in a vertical direction, and the three antennas are placed so as to form a U-shape when viewing the three antennas as a whole.

8. A reader/writer performing a two-way communication with a contactless tag through electromagnetic induction and supplying electric power to the contactless tag, comprising:
    a plurality of first antenna coils for electromagnetically coupling with a second antenna coil in the contactless tag;
    a first amplifier circuit amplifying a signal which each of the plurality of first antenna coils transmits;
    a plurality of matching circuits coordinating an impedance of the plurality of first antenna coils and the first amplifier circuit and made of a grounded circuit;
    a plurality of first switches, wherein each of the plurality of first switches is provided between the first amplifier circuit and each of the plurality of matching circuits;
    a plurality of second switches, wherein each of the plurality of second switches is provided between each of the plurality of matching circuits and each of the plurality of first antenna coils;
    a second amplifier circuit amplifying a signal which each of the plurality of first antenna coils receives; and
    a plurality of third switches provided between the second amplifier circuit and each of the plurality of first antenna coils.

9. The reader/writer according to claim 8, further comprising:
a control circuit turning on a predetermined switch among the plurality of first switches, a predetermined switch among the plurality of second switches and a predetermined switch among the plurality of third switches.

10. A reader/writer performing a two-way communication with a contactless tag through electromagnetic induction and supplying electric power to the contactless tag, comprising:
a plurality of antenna circuits, each of the plurality of antenna circuits having a first antenna coil for electromagnetically coupling with a second antenna coil in the contactless tag;
a plurality of first amplifier circuits amplifying a signal which each of the plurality of antenna circuits transmits;
a plurality of first switches, each of the plurality of first switches provided prior to each of the plurality of first amplifier circuits;
a second amplifier circuit amplifying a signal which each of the plurality of antenna circuits receives;
a plurality of second switches, each of the plurality of second switches provided between the second amplifier circuit and each of the plurality of antenna circuits;
a control circuit turning on a predetermined switch among the first switches and a predetermined switch among the second switches,
a modulation circuit that modulates a carrier wave based on data output from the control circuit,
wherein the first antenna coils have a loop shape and a plurality of the first antenna coils are provided adjacent to each other in the same plane, and the loop of the first antenna coils has a shape such that an adjoining region of the first antenna coils becomes as small as possible.

* * * * *